United States Patent [19]
Brown et al.

[11] Patent Number: 5,830,390
[45] Date of Patent: Nov. 3, 1998

[54] METHOD FOR CONTINUOUS MOLDING AND APPARATUS THEREFOR

[75] Inventors: Robert L. Brown, Hartville, Ohio; Michael K. Parrent, Welland, Canada; David E. Baxter, Ravenna, Ohio

[73] Assignee: Gencorp Inc., Fairlawn, Ohio

[21] Appl. No.: 877,349

[22] Filed: Apr. 30, 1992

Related U.S. Application Data

[63] Continuation of Ser. No. 621,675, Nov. 30, 1990, abandoned.

[51] Int. Cl.$^6$ .................................................... B29C 45/400
[52] U.S. Cl. ................. 264/39; 264/297.2; 264/297.6; 264/328.11; 425/225; 425/233; 425/575; 425/588
[58] Field of Search ........................... 264/39, 259, 297.2, 264/297.6, 297.8, 328.8, 328.11, 328.14, 328.15; 425/225, 233, 547, 556, 574, 575, 581, 588, 595, 116, 129.1, 129.2

[56] References Cited

U.S. PATENT DOCUMENTS

| | | | |
|---|---|---|---|
| 1,935,794 | 11/1933 | Geyer | 264/297.8 |
| 2,536,120 | 1/1951 | Beare . | |
| 2,790,206 | 4/1957 | Cofek . | |
| 3,005,235 | 10/1961 | Patera | 425/576 |
| 3,308,508 | 3/1967 | Schrenk | 425/190 |
| 3,506,755 | 4/1970 | Rudder et al. . | |
| 3,924,995 | 12/1975 | Crooks et al. | 425/575 |
| 3,973,891 | 8/1976 | Yamada . | |
| 3,986,804 | 10/1976 | Albright . | |
| 4,111,623 | 9/1978 | Black . | |
| 4,186,161 | 1/1980 | Ulmschneider et al. | 264/297.3 |
| 4,315,727 | 2/1982 | Black . | |
| 4,315,885 | 2/1982 | Lemelson . | |
| 4,352,654 | 10/1982 | Heimberger . | |
| 4,372,738 | 2/1983 | Black et al. . | |
| 4,403,810 | 9/1983 | Bieneck . | |
| 4,424,015 | 1/1984 | Black et al. . | |
| 4,561,626 | 12/1985 | Black . | |
| 4,575,328 | 3/1986 | Fierlans et al. | 425/126 |
| 4,671,764 | 6/1987 | Hehl . | |
| 4,693,679 | 9/1987 | Marth | 425/589 |
| 4,790,739 | 12/1988 | Manfred | 425/192 |
| 4,877,387 | 10/1989 | Fierkens | 425/575 |
| 4,961,888 | 10/1990 | Brown | 425/575 |

FOREIGN PATENT DOCUMENTS

| | | |
|---|---|---|
| 2335973 | 1/1975 | Germany . |
| 581642 | 10/1946 | United Kingdom . |
| 2158003 | 6/1985 | United Kingdom . |

OTHER PUBLICATIONS

Frados, *Plastics Engineering Handbook*, 1976, pp. 445 and 446.

Primary Examiner—Jill L. Heitbrink
Attorney, Agent, or Firm—Robert F. Rywalski; Jeanne E. Longmuir

[57] ABSTRACT

A method and apparatus for a nonsynchronous system for continuously molding articles from a material cured by the control of temperature and pressure. The apparatus includes a multi-section self-clamping mold, a controller system, a material injector, a transfer system, a curing apparatus for curing the articles, and a mold separator-assembler. The method comprises pre-treating and then assembling the mold in a clamped condition. Under the control of the controller system, the mold is then injected with material from the injector, and moved by the transfer system through the curing apparatus to cure the material within the mold. Once cured, the controller system moves the mold to the mold separator-assembler via the transfer system. The mold is then disassembled into sections, the molded article is removed, and the sections are pre-treated and reassembled, for the next injection operation.

7 Claims, 10 Drawing Sheets

METHOD FOR CONTINUOUS MOLDING AND APPARATUS THEREFOR

This is a continuation of application Ser. No. 07/621,675 filed on Nov. 30, 1990, now abandoned.

TECHNICAL FIELD

The present invention relates to a method apparatus for continuous molding, and more particularly to a method and apparatus for continuous molding of articles from a material which is cured by control of temperature and pressure.

BACKGROUND OF THE INVENTION

A variety of continuous injection molding systems are currently available for manufacturing articles using materials cured by the control of heat and pressure. In the past, single or multiple cavity, divided molds were typically used in such systems. The molds were generally pre-heated to a desired temperature, and material was then injected into the molds. The molds were first clamped or compressed, and then injected with molding material using, for example, an injection press, and cured under pressure. Such compression was believed necessary, particularly with natural rubbers, to obtain the desired characteristics in the resulting molded articles.

The production rate of injection molded articles in systems of the type mentioned above has been increased using conveyors to transport the molds between injection, compression and heating stations. U.S. Pat. No. 1,935,794, for example, provides a method of molding in which the mold is transported by a transfer system between heating stations and a compression station, and maintained under compression during transport through a curing station.

U.S. Pat. No. 4,186,161 shows an alternate method of molding articles. The method uses a rotor assembly for moving multiple molds mounted on the rotor assembly past an extruder which injects material into each mold. A ram operation is then performed on each mold to compress the material within each mold on the assembly.

One disadvantage with systems of this type, is that the molded articles produced typically require additional processing to remove flash from the articles. The formation of flash and removing it result in increased costs due to wasted material, and the additional cost to deflash the articles, or remove the excess material, and finish the article. An additional inspection of each article may also be required, which further increases the overall labor expense of these systems.

A second disadvantage, specifically with respect to systems using the injection press to apply continued pressure to the mold for curing of the material, is that the use and operation of the injection press is primarily as a press, rather than as an injector. The use of an expensive injection press, for a purpose other than its intended purpose is inefficient and reduces the cost effectiveness of these systems.

SUMMARY OF THE INVENTION

The present invention provides a new and improved method and apparatus for continuously molding articles from a material cured by the application of temperature and pressure. As used herein, the term "cure" is intended to include treatment by the application of either heating or cooling temperatures, cross-linking of the material to be cured, and other material treatments whereby the molding process is completed and the material to be molded attains its finished condition. The system is a nonsynchronous system wherein a multi-section, self-clamping mold is injected with molding material by a material injector. A transfer system is then used to transport the mold to a curing apparatus for curing the article. Once the molded article is cured, the mold is transported by the transfer system to a mold separator-assembler wherein the mold is unclamped, and disassembled into its sections, so that the finished molded article may be removed from a mold section. The empty mold sections are then pre-treated, assembled and clamped for transport from the mold separator-assembler by the transfer system to a position for production of additional molded articles. A controller system choreographs operation of the injection system for injection of the molding material into the molds, and the proper timed movement of the molds by the transfer system through the material injector, curing apparatus and mold separator-assembler to ensure the proper curing of the articles to be molded.

In accordance with the preferred method and apparatus of the present invention, the material to be cured is a high grade compound molding material, which need not be continuously maintained in clamped or compressed position within a press to be cured and achieve the desired fatigue, heat resistance, or other characteristics. The self-clamping, pre-loaded mold is preferably a single cavity mold having two or more sections. However, molds having different internal configurations may be used within the system, and molds having one or more cavities may also be used, to enable the concurrent molding of different parts. The mold includes a clamping device for securing the sections in pre-loaded condition, in which the sections are arranged in stacked or parallel planar relationship. In the clamped or pre-loaded condition, the mold is under pressure, without the use of an external press or other clamping or loading force.

Prior to injection of material into the mold, the mold is preferably pre-treated with any necessary mold coatings, heated to a desired temperature to assist with curing of the material, or provided with any inserts or other internal elements to be included within the article to be molded. Upon completion of the pre-treatment process, the mold is assembled and the self-clamping device is engaged to clamp sections of the mold together under a force of approximately 6000 pounds. The mold is then moved into position for the injection of the molding material.

An injection system having a material injector with an injection head is preferably used for injecting the molding material into the clamped mold. Once injection of the molding material is completed, the self-clamping mold is removed from the injection system, and preferably moved into communication with a transfer system.

The transfer system transports the mold to a curing apparatus. In the preferred construction of the present invention, the curing apparatus includes a curing oven, through which the molds are transported by the transfer system. The curing process is, however, intended to include a process which changes the physical form of the material, e.g. conventional vulcanization and melting and solidification as in thermoplastic crystallization. The transfer system transports the mold through the curing oven at a rate sufficient to complete curing of the molded article when the mold exits the curing oven. Where different molds are used containing different molded articles, the controller system ensures that movement of the different molds and articles via the transfer system, for example, through the curing apparatus, is properly timed for curing of the articles to be molded. Such curing apparatus may include, but is not limited to, induction, conduction, radiation and the like. By combining the use of a high grade of molding material, a self-clamping mold to maintain the molding material under pressure without using the pressure applied by the injection head during the injection of material into the mold, and a curing apparatus, the method and apparatus of the present invention reduces the overall time required to process each molded article, eliminates flash formation on the molded articles, and compensates for the shrinkage of the molding material during the curing process. Additionally, the molded articles produced using the present system have physical properties substantially equal to those of the prior compression or injection molded articles.

Once the molded article is cured, the transfer system transports the mold to a mold separator-assembler device, for removal of the molded article, and pre-treatment of the mold for the next molding process. The separator-assembler device releases the clamping device of the mold, and disassembles the mold into its respective sections. Once separated, the mold sections are preferably moved between work stations of the separator-assembler device in co-planar relationship. At a first work station, the molded article is removed from one of the mold sections. At successive work stations, the mold sections are cleaned, inspected and pre-treated for the next molding process. As discussed, pre-treatment may include steps such as coating the interior of the mold or loading the mold with elements to be formed in the articles to be molded, e.g. metal inserts for bushings. Finally, the mold sections are moved to a reassembly station, where the mold separator-assembler reassembles the mold sections in adjacent, parallel planar relationship, and secures the mold in clamped condition using the clamping device. Using the transfer system, the mold is then transported to the injector system for injection molding of the next article.

Other features and advantages of the present invention will become apparent from the following detailed description of preferred embodiments made with reference to the accompanying drawings, which form a part of the specification.

DETAILED DESCRIPTION OF THE PREFERRED EMBODIMENTS

Figure 1A:
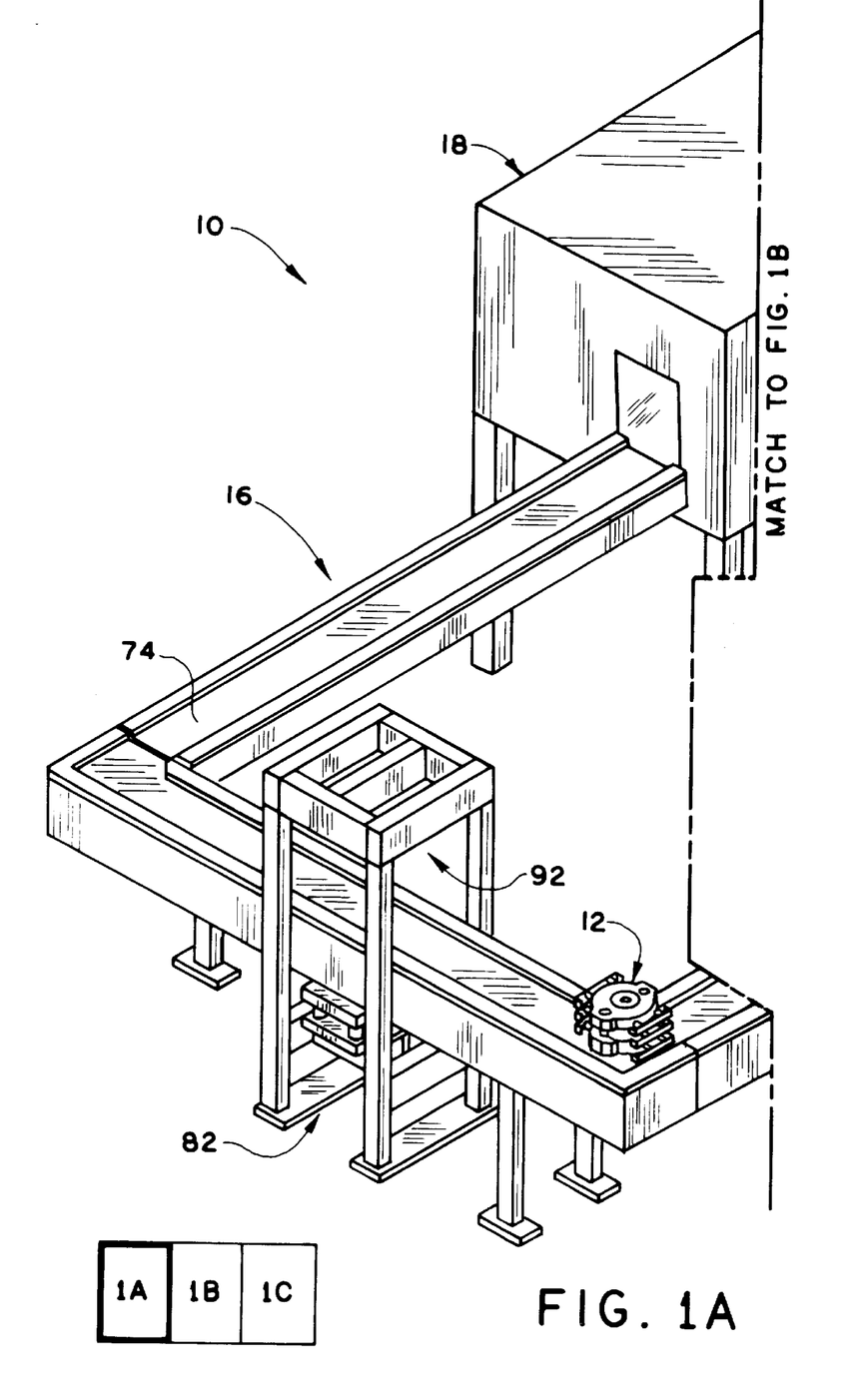
FIG. 1 is a schematic, perspective view of a system for continuous molding of articles in accordance with the present invention.
Figure 1B:
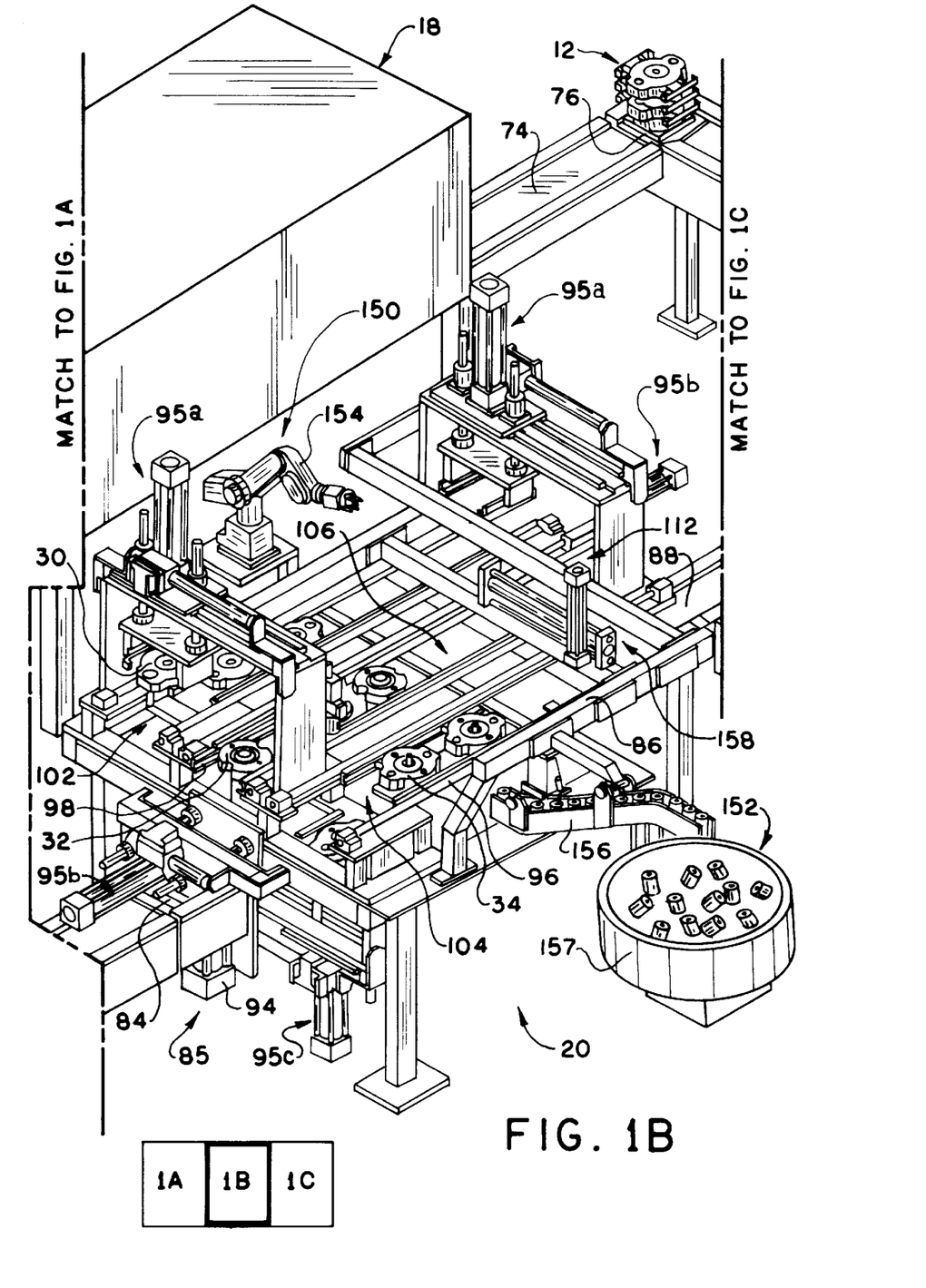
Figure 1C:
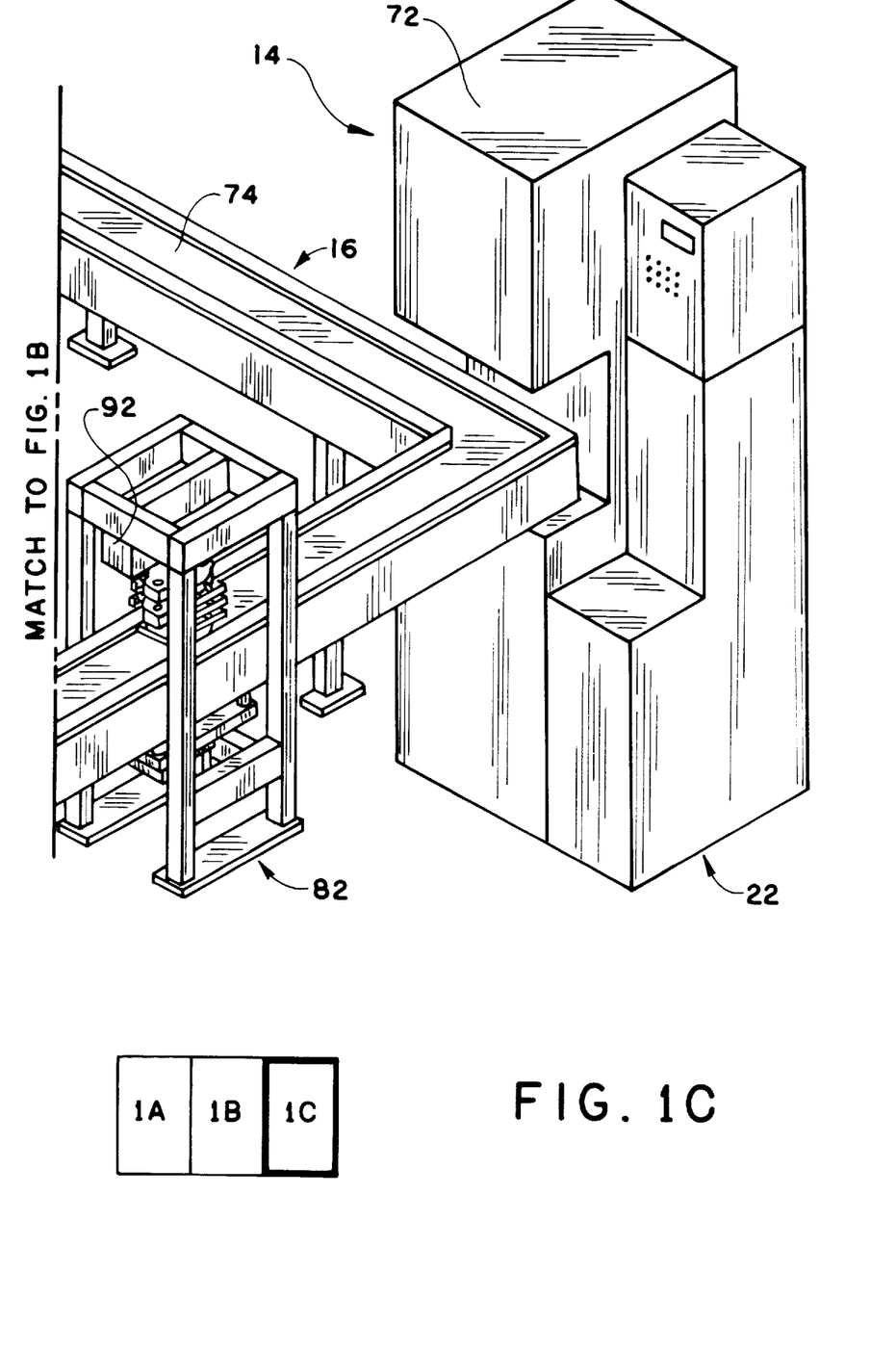
Figure 2A:
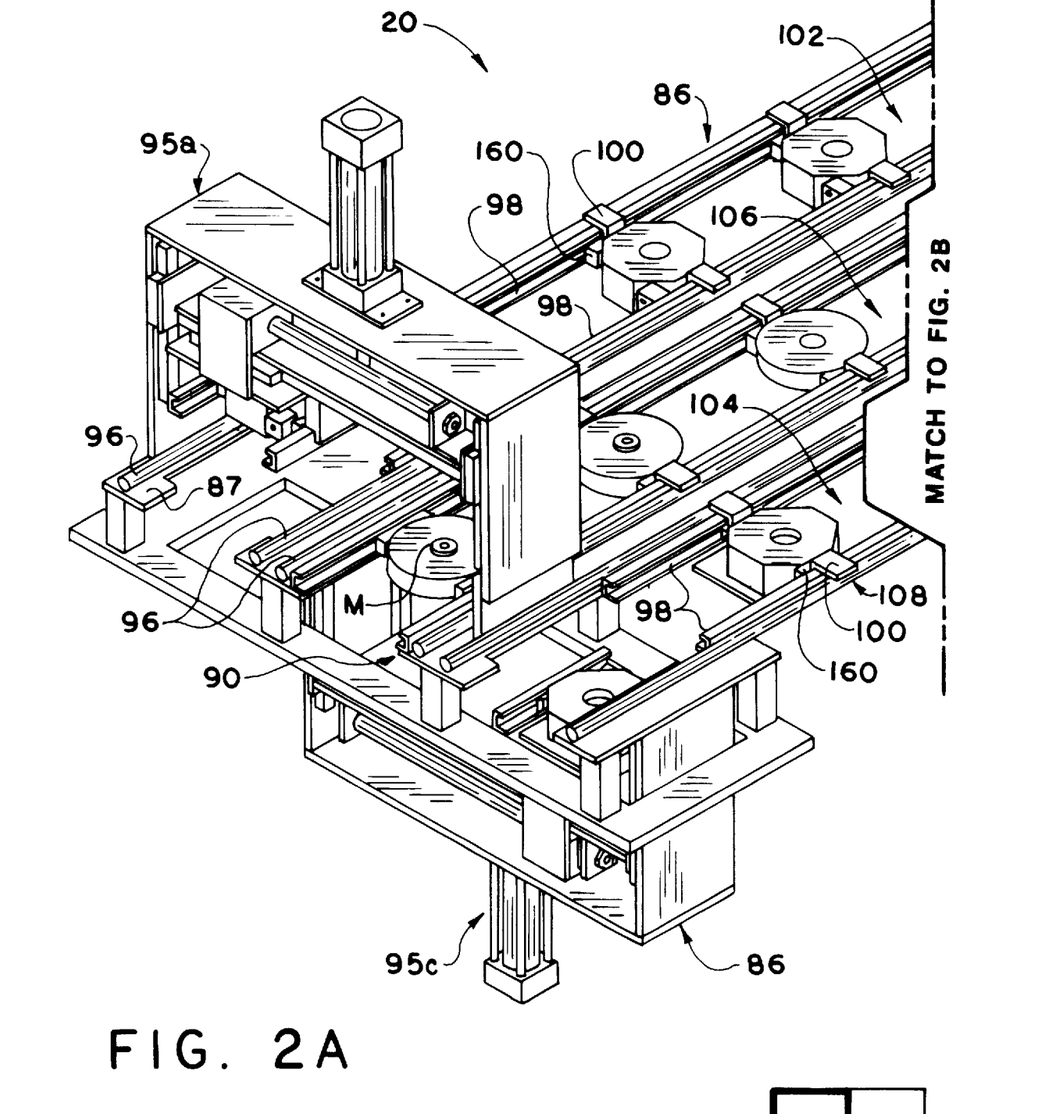
FIGS. 2A and 2B are schematic, partial perspective views of apparatus used to separate and assemble molds in accordance with the present invention.
Figure 2B:
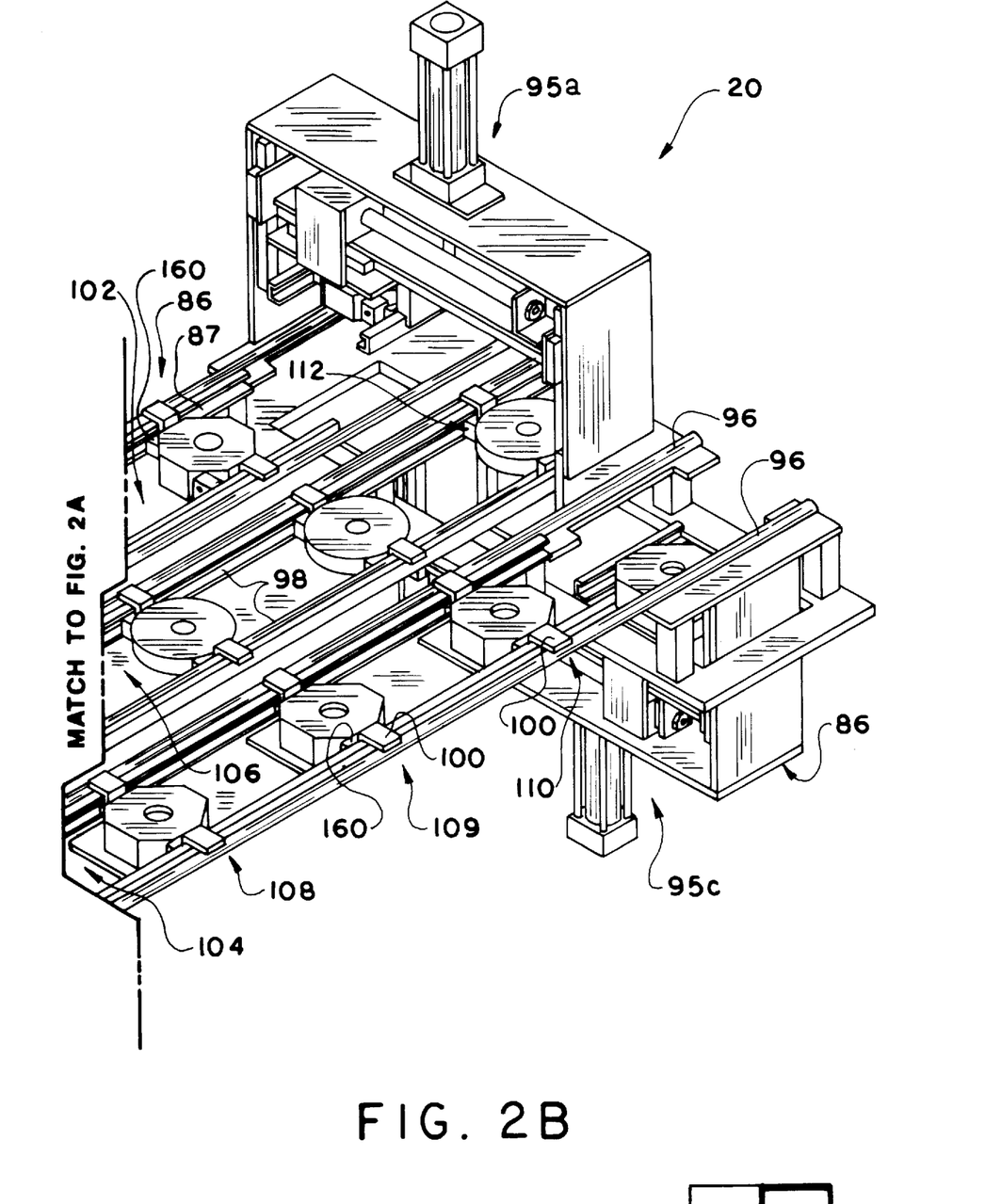
Figure 3A:
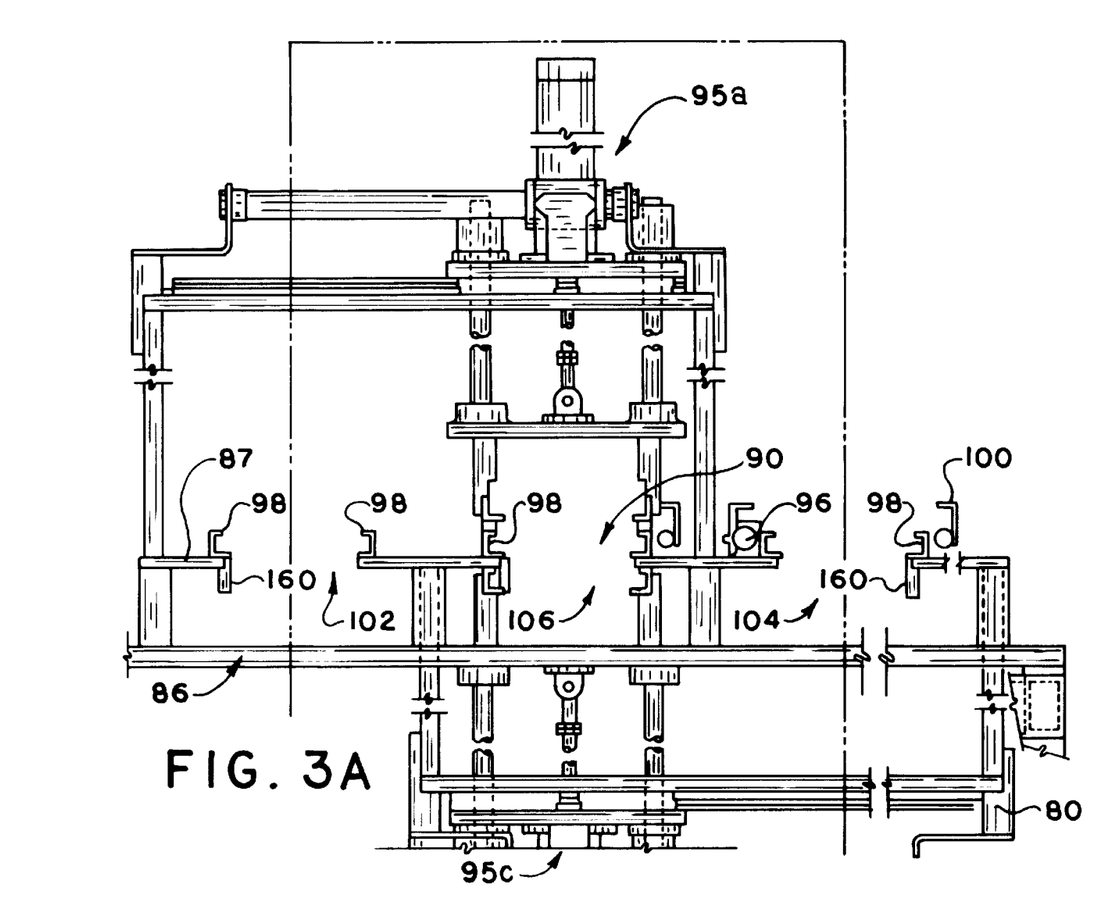
FIGS. 3A and 3B are schematic, sectional end and side views, respectively, of the apparatus shown in FIGS. 2A and 2B.
Figure 3B:
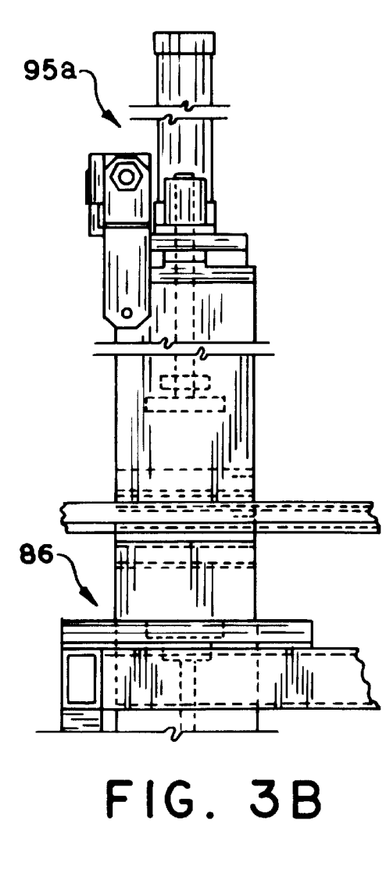

FIG. 1 schematically illustrates an apparatus 10 for continuously and nonsynchronously molding articles from a material cured by heat and pressure. The apparatus includes multi-section, self-clamping molds 12 which are injected with molding material by a material injector 14, and then transported by a transfer system 16 to a curing apparatus 18 for curing the article to be molded. After the article is cured, the mold 12 is transported by the transfer system 16 to a mold separator-assembler 20 where the mold is disassembled, the molded article removed, and the mold sections are treated and reassembled for the next molding operation. The timing of injection of the mold, and movement of the mold through the curing apparatus 18 and mold separator-assembler 20, is controlled by a controller system 22. In an alternate schematic embodiment of FIG. 7 of the apparatus 10', a pre-treatment device 23, e.g. heating, is provided for treating the molds prior to injection of the molding material.

Figure 4:
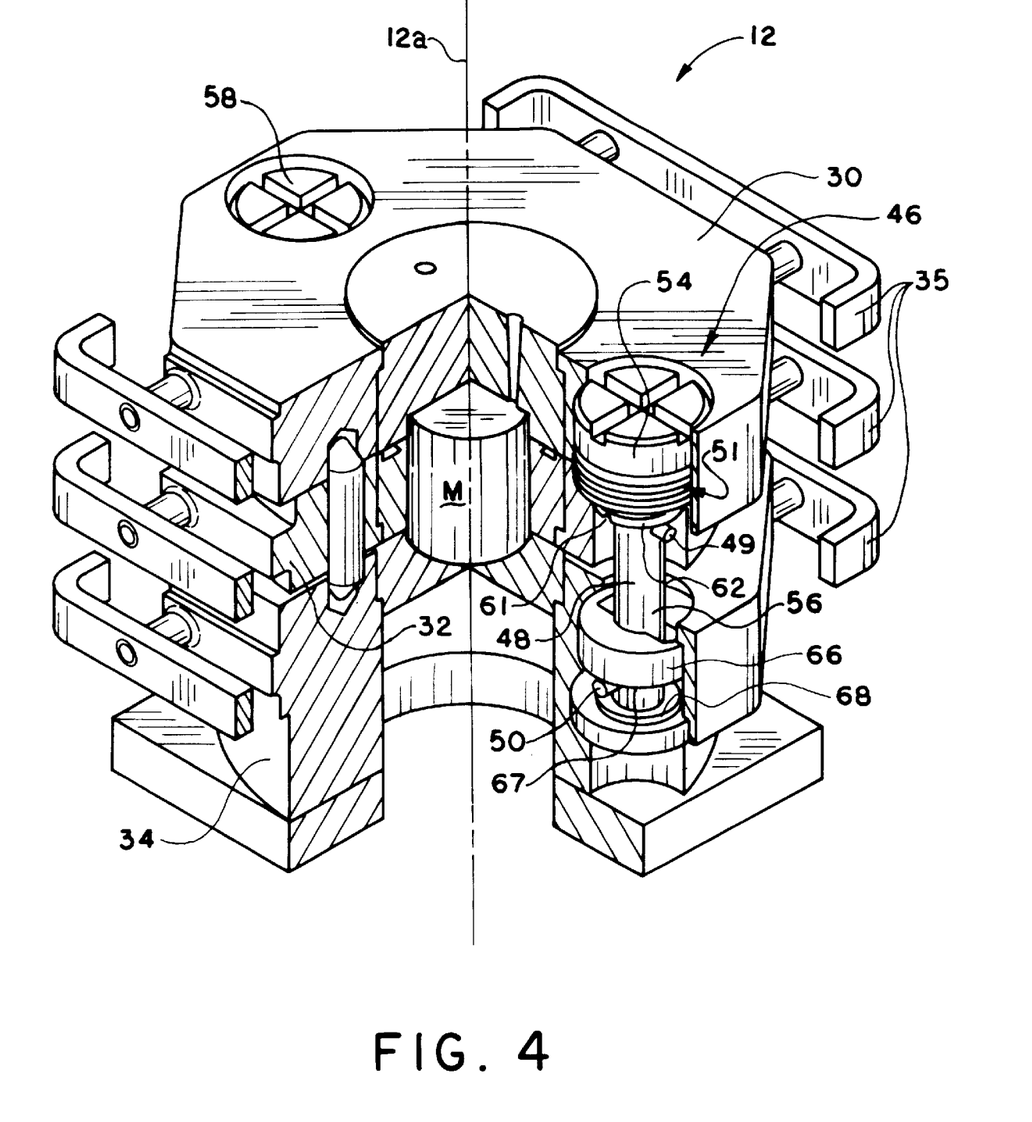
FIG. 4 is a cross-sectional perspective view of a multi-section, self-clamping mold shown in clamped position.

As illustrated in the preferred embodiment of FIG. 4, the multi-section, self-clamping, pre-loaded mold is a single cavity mold 12 which includes three sections: a top section 30, a middle section 32, and a bottom section 34. In the stacked and clamped position illustrated in FIG. 4, the mold sections are aligned along a central mold axis 12A.

Prior to clamping of the mold 12 to the pre-loaded condition, the mold is preferably pre-treated: a) by coating the mold cavity with any necessary coatings to enable the article to be molded to be readily removable from the mold cavity; and b) by including additional inserts or other internal elements to be formed within the article to be molded. Upon completion of the pre-treatment process, the mold 12 may be fully assembled and a self-clamping device 46 engaged to clamp the sections of the mold. The self-clamping device 46 includes locking bolts 48 having lock pins 50, and spring washers 51. Each locking bolt includes a head portion 54 and a body portion 56. Additionally, lock pins are included which ride on an inclined caming surface 67 formed on the bottom of a cam insert 66. In the clamped condition illustrated in FIG. 4, the mold sections 30, 32, 34 are compressed under a force of approximately 6000 pounds. By turning the locking bolts 48 one quarter turn, the lock pins 50 engage the inclined caming surface 67 to deflect the spring washers 51. Detent pins 49 prevent rotation of the lock pins 50 when engaged in a detent portion 61 of a detent insert 62 in the unlocked position.

Once the mold 12 is pre-treated, assembled and clamped, the mold is ready for injection of the molding material. The molding material M used in the preferred embodiment of the present invention, is a high grade compound material which upon curing obtains characteristics of high fatigue, heat resistance, and other desirable characteristics.

The controller system 22 includes a programmable logic controller. The logic controller of the controller system 22 provides individual control of each mold 12, including operation of the injection system 14, transfer system 16, curing apparatus 18, and mold separator-assembler 20. Operation of the controller system 22 is preferably automatic, however, the controller system may be in part manually operated by a skilled operator to manipulate system operations or movement of the molds 12 as desired.

Figure 5A:
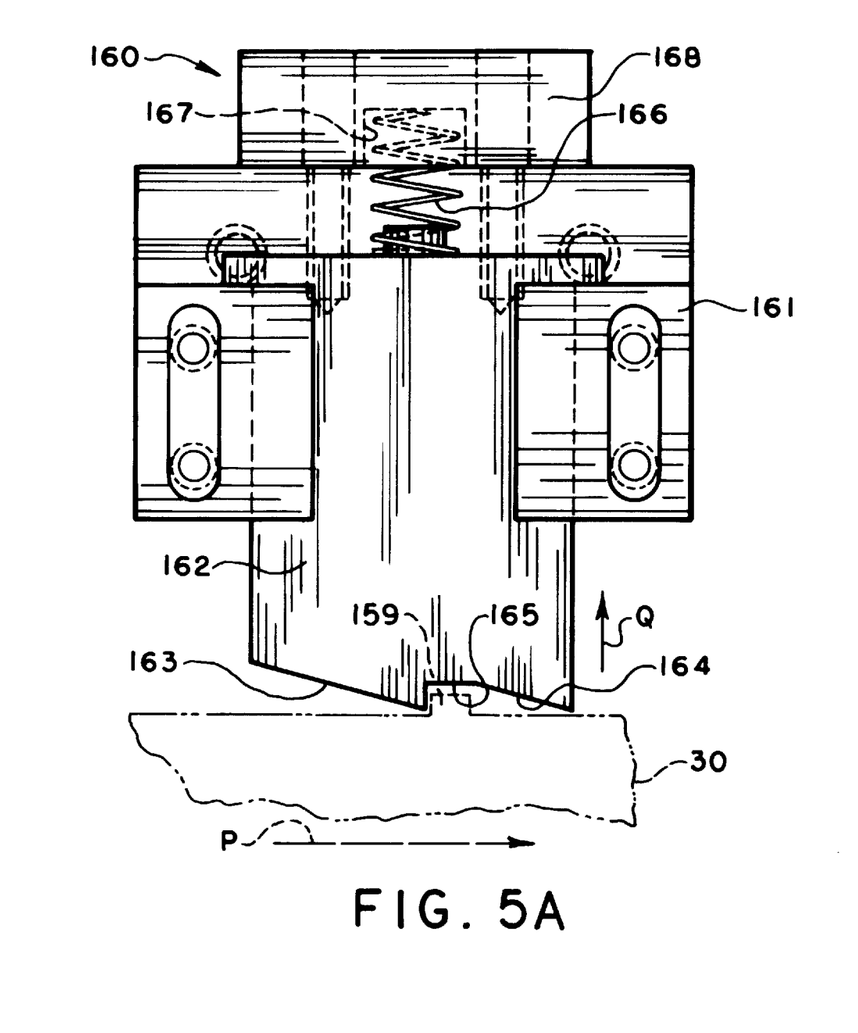
FIGS. 5A and 5B are front and side views, respectively, of a spring biased engagement member.
Figure 5B:
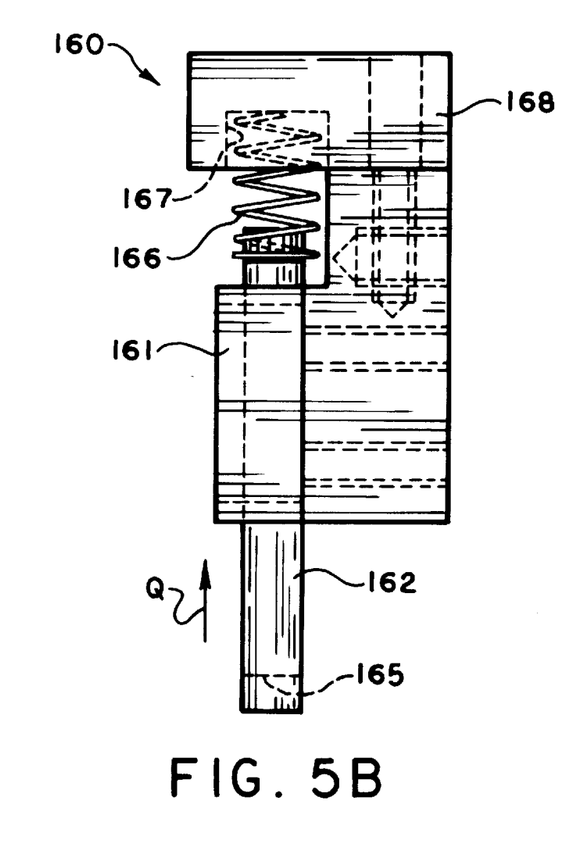

The injection system 14 preferably includes an injection press 72. As schematically illustrated in FIGS. 1 and 5, the injection press 72 is a single station press. The preferred injection press includes a dual screw, hydraulic ram injector, of the type currently available from Sanyu of Japan. After clamping an injection head of the press 72 on the mold 12, the molding material M is then injected. The time required for the injection of molding material into the mold 12 is approximately 15 seconds. Once injection of the molding material is completed, the injection head is removed from the mold, and the mold is removed from the injection press by the transfer system 16.

The controller system 22 nonsychronously moves the mold 12 from the injection system 14, to the curing apparatus 18 via the transfer system 16. In the illustrated embodiment, the transfer system 16 is a conveyor 74 preferably having individual pallets 76 for supporting individual molds 12 during movement from the injection system 14 to the curing apparatus 18, and the remainder of the system.

As shown schematically in FIG. 1, the curing apparatus 18 comprises a conventional curing oven. Although the conventional curing oven uses temperature to provide material curing, alternative curing methods, such as induction, are also possible. The molds 12 are preferably moved via the transfer system 16 through the curing oven 18 at a rate resulting in complete curing of the article to be molded once the mold exits the curing oven. In the event molds 12 having different mold inserts, or molds containing articles molded of different material, are used, the controller system 22 slows or speeds transport of the molds through the curing oven, and controls the temperature within the curing oven, to ensure that the molds are precisely maintained at the proper temperature for the necessary time to cure the articles to be molded. Additionally, the conveyor 74 within the curing oven 18 may have matrix configurations, multiple line formations or an accumulator, to provide the molds 12 transported through the oven with longer curing or holding times, as may be necessary.

Once curing is completed, the mold 12 is removed from the curing oven 18 on the conveyor 74. The mold 12, together with the cured article being molded, is transferred to the mold separator-assembler device 20 via the conveyor 74, and under control of the controller system 22. The mold 12 is provided to the mold separator-assembler device 20 for removal of the molded article, and pre-treatment of the mold for the next molding process.

Figure 7:
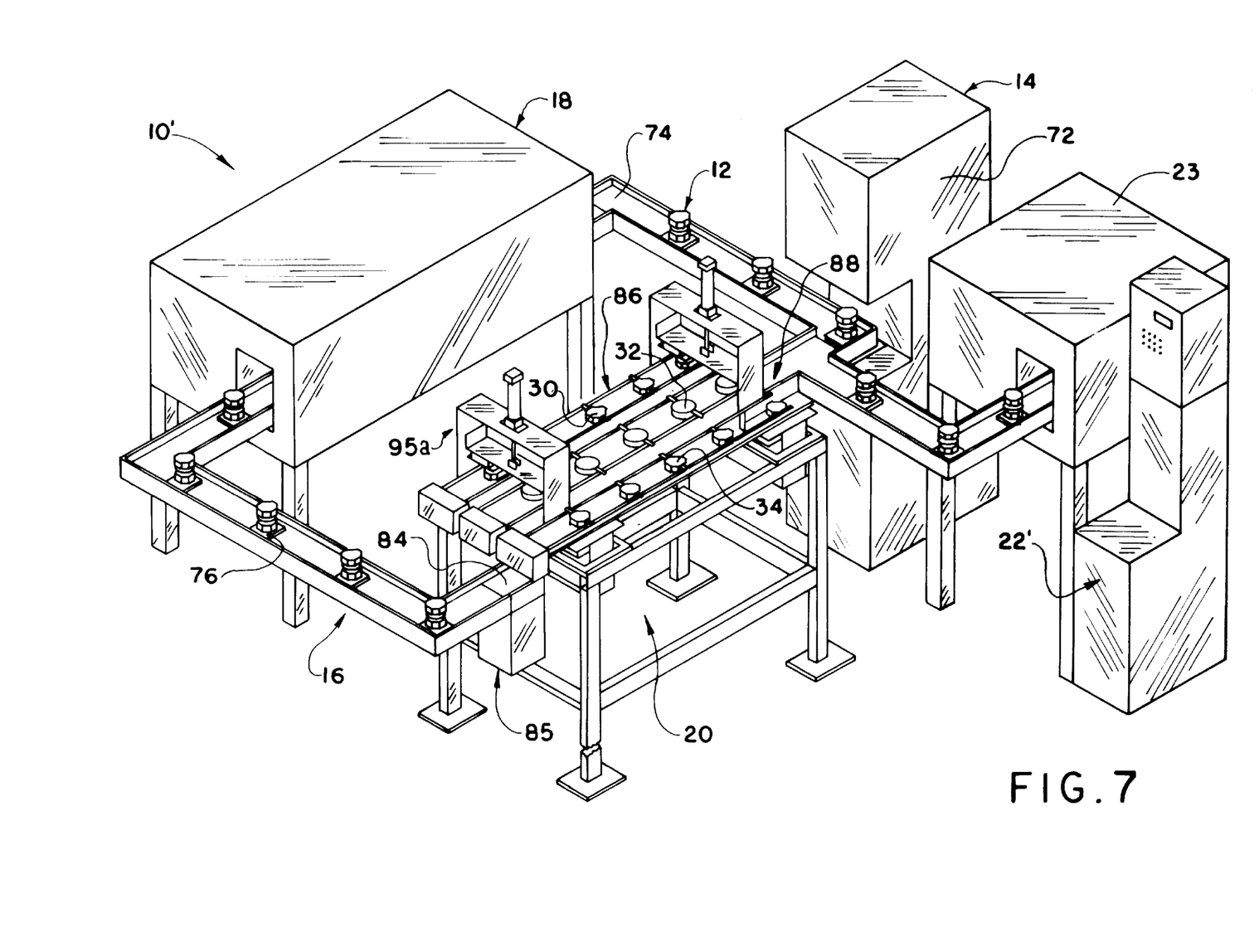
FIG. 7 is a schematic, partial perspective view of an alternate embodiment of a system for continuous molding of articles in accordance with the present invention.

The preferred embodiment of the separator-assembler device 20, illustrated in FIGS. 1, 2A, 2B, 3A, 3B and schematically in FIG. 7, provides parallel processing of the individual molds and their sections. The separator-assembler device 20 includes mold latch mechanisms 82, a receiving station 84, mold elevators 85, a conveyor table 86, an intermediate transport mechanism 150, a mold article take-away mechanism 152 and an exiting station 88.

Prior to entering the conveyor table 86 of the separator-assembler device 20, the mold 12 is conveyed to a first mold latch mechanism 82, positioned along the conveyor 74 before the receiving station 84 and conveyor table 86. The mold latch mechanisms 82 include a pneumatic cylinder which operates to release the clamping device 46 of the mold 12 using torquing tools 92 for engaging and torquing the locking bolts 48 to disengage the detent pins 49 and locking pins 50.

Once the clamping device 46 of the mold 12 is disengaged by the first mold latch mechanism, the mold is moved by the conveyor 74 to the receiving station 84 of the separator-assembler device 20. At the receiving station 84, the sections 30, 32, 34 of the mold 12 are supported on a mold elevator 85, having a pneumatic cylinder for movement of the mold elevator into engagement within the conveyor table 86. Specifically, the mold elevator 85 includes a pneumatic cylinder actuator 94 for providing vertical movement of the mold sections. Additionally, pneumatic actuators 95a, 95b, 95c positioned above, at the level of, and below the conveyor table 86, are also provided for horizontal movement of the mold sections. Each of the individual pneumatic actuators 95a, 95b, 95c includes a pneumatic cylinder and additional pneumatically operated equipment, as schematically illustrated, to provide operating movement of the actuators. The application and operation of such cylinders and equipment are conventional, and thus are not further discussed in detail.

During movement and disassembly of the mold into sections, and the positioning of each mold section within the conveyor table 86, the assembled and unlatched sections 30, 32, 34 of the mold 12 are first moved via the conveyor onto the mold elevator 85 and vertically raised by the cylinder 94 of the mold elevator 85 to a position in approximately the same plane as the conveyor table 86. The mold sections are then pushed by the actuator 95b from the raised mold elevator 85 to a position such that the middle section 32 of the mold is supported within the track of the conveyor table 86 for mold middle sections, generally referenced at 106. The top section 30 of the mold 12 is then horizontally moved and vertically lowered by the actuator 95a, positioned above the conveyor table, into engagement with a track of the conveyor table 86 for mold top sections 30, generally referenced at 102. The actuator 95c positioned below the conveyor table 86, moves the bottom section 34 horizontally and vertically upward to a track of the conveyor table 86 for mold bottom sections 34, generally referenced at 104.

Prior to any movement of the top and bottom mold sections 30, 34 by the upper and lower actuators 95a, 95c, the handle portions 35 of the middle mold section 32 are supported on, and captured between, opposite, parallel C-shaped flanges 98, as illustrated in FIGS. 2A, 2B, 3A and 3B, which form the middle track 106 of the conveyor table. Additional pairs of opposite, parallel flanges 98 form the top mold section track 102 and bottom mold section track 104 of the conveyor table 86. Adjacent the opposite flanges 98 forming each of the tracks are positioned pneumatically controlled rotatable shafts 96 having L-shaped flanges 100 secured thereto. The top and bottom sections 30, 34 of the mold 12 are positioned in their respective tracks 102, 104, upon movement by the actuators 95a, 95c.

To move the mold sections 30, 32, 34, along their respective tracks 102, 106, 104, the L-shaped flanges 100 are rotated to capture the handle portions 35 of each of the mold sections within the C-shaped flanges 98. Upon rotation of the shafts 96 under control of the controller system 22, the L-shaped flanges 100 rotate into engagement surrounding the handle portions 35, thereby capturing the handle portions within the C-shaped flanges 98 forming the tracks. Horizontal pneumatically controlled movement of the rotatable shafts 96 is then used to move the mold sections 30, 32, 34 along their respective tracks on the conveyor table 86 to the work stations.

Additionally, spring biased engagement members 160 of the type illustrated in FIGS. 5A and 5B are used to properly position each mold section at the next work station. In the illustrated example of FIG. 5A, a rib portion 159 of the top mold section 30 is engaged with the engagement member 160. As shown in FIGS. 2A, 2B, 3A, 3B, the engagement members 160 are secured to a support surface 87 of the conveyor table 86 adjacent the C-shaped flange 98. The engagement members are positioned at each of the work stations for engagement with rib portions 159 formed in the mold sections. In this engaged position, the engagement members 160 operate to position the moving mold sections within their work stations along their respective tracks.

The engagement members 160 include a spring biased portion 162 which is surrounded and slidably engaged within a flanged member 161 which is secured by conventional fasteners along the support surface 87 of the conveyor table 86. The spring biased portion 162 has an entrance ramp portion 163 and an exit ramp portion 164 surrounding and a groove portion 165. The spring biased portion 162 engages a spring 166 which is also engaged within an opening 167 formed in a top portion 168, which is secured by conventional fasteners along the support surface of the conveyor table.

Upon horizontal movement of the mold section 30 in the direction of the arrow P into engagement of the entrance ramp portion 163 with the rib portion 159 of the mold section, the spring biased portion 162 of the engagement member 160 is biased in the direction of the arrow Q. The spring biased portion 162 is vertically biased until the rib portion 159 engages the groove portion 165. In this position, the mold section is properly positioned at the work station. Continued movement of the mold section along the track in the direction of the arrow generally referenced at P, moves the rib portion 159 along the exit ramp portion 164 and out of engagement with the spring biased engagement member, until the rib portion 159 is engaged with the next spring biased engagement member 160 at the next successive work station. Although the embodiment of the spring biased engagement member 160 illustrated in FIGS. 5A and 5B is for engagement with an upwardly directed rib portion 159 on a top mold section 30, an alternate and reverse embodiment of the spring biased engagement member (not illustrated) may be used for engagement with downwardly directed rib portions on the mold sections.

Once the mold sections are separated, and positioned in their respective mold section tracks along the conveyor table 86, the sections are horizontally moved in their parallel relationship between work stations within the flanges 98 under pneumatic control of the rotatable shafts 96 and L-shaped flanges 100. Movement of the mold sections between work stations along the conveyor table 86 is in parallel, co-planar relationship. At a first work station 108, the molded article is removed from, for example, the middle mold sections 32. Removal of the molded articles may be by an operator, or by an intermediate transport mechanism 150, as illustrated in FIG. 1. The intermediate mechanism 150 is illustrated as a robotic arm device 154 under direction of the controller 22, and capable of grasping the molded article and depositing it in a molded article take-away device 152. The take-away device may be a conventional conveyor system 156, or simply a supply container 157 provided adjacent the conveyor table and intermediate mechanism. An additional pneumatic actuator 158 may alternatively be used either alone, or in combination with other devices, to assist with vertical and horizontal movement of the molded article to the conveyor system 156 and/or supply container 157. It should be understood, that additional conveyor devices, pneumatic actuators and/or intermediate mechanisms may also be provided at any or all of the work stations, either to supply additional materials to the molds within the conveyor table, or to remove materials from the molds.

At a second work station 109, the mold sections are cleaned and inspected. At a third work station 110, the mold sections are provided with some pre-treatment processing in advance of the next molding process. In the preferred embodiment of the present invention, the pre-treatment includes coating the interior of the mold inserts and/or loading the mold inserts with elements to be formed in the articles to be molded. As discussed above, the steps performed at the work stations of the mold separator-assembler device 20 may be accomplished manually, or mechanically using conventional robotics techniques of the type illustrated.

Finally, the mold sections are moved to a reassembly station 112 on the conveyor table 86 of the mold separator-assembler device 20. From the reassembly station 112, the mold separator-assembler device 20 reassembles the mold sections 30, 32, 34 to their original adjacent, parallel planar relationship in the middle track 106 of the conveyor table 86. The reassembly process is performed pursuant to steps opposite from those described in connection with the separation of the mold sections, and using the actuator 95b to position the sections of the mold 12 on the mold elevator 85 using actuator 94.

Figure 6:
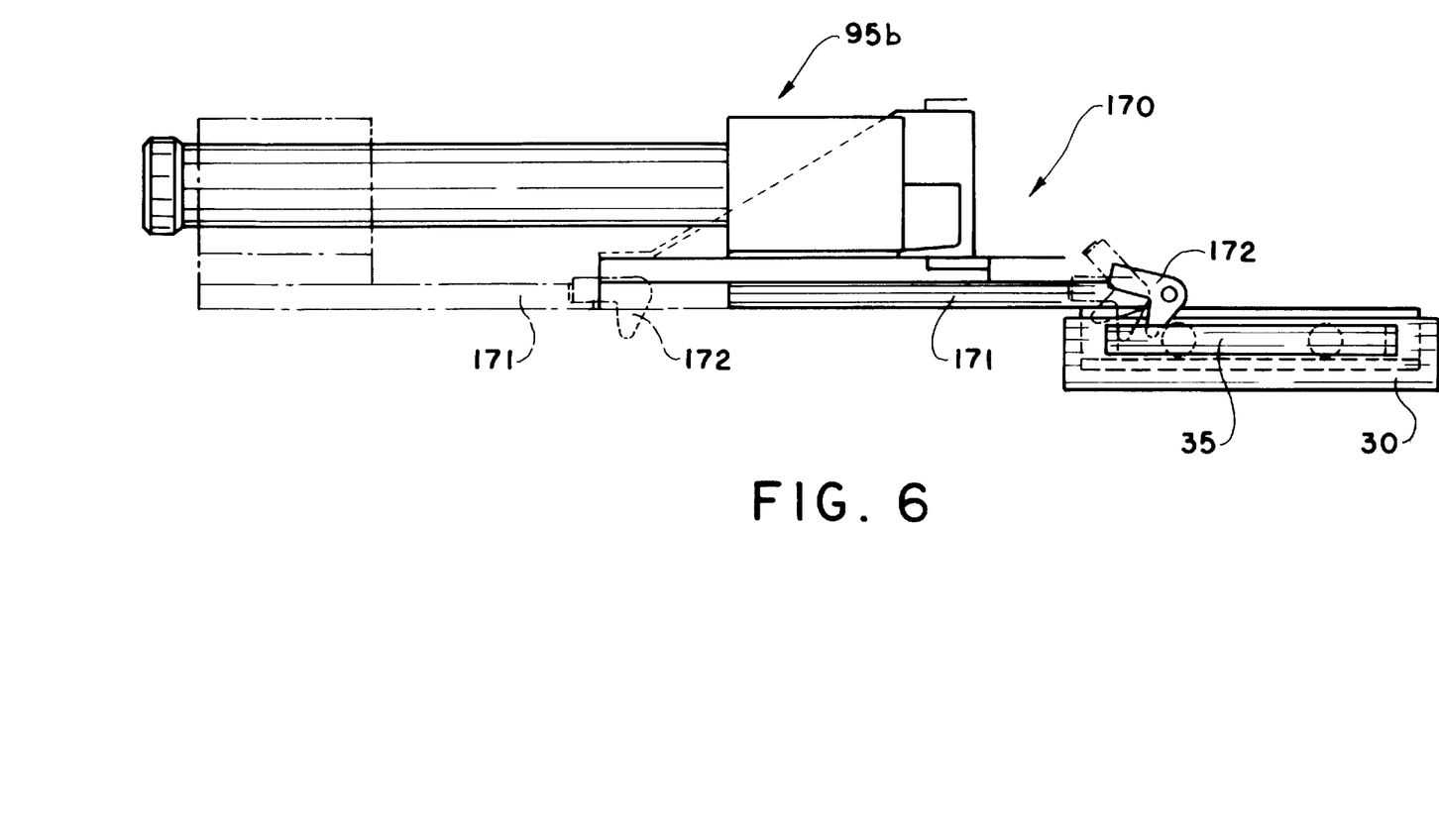
FIG. 6 is a schematic, partial side view of a portion of the separator-assembler device, in part illustrated in FIG. 1, used to discharge a mold to the transfer system.

The reassembly process is performed in reverse of the process previously described, and thus only portions of the process not previously discussed are provided. Specifically, the actuator 95b includes a puller 170 of the type schematically illustrated in FIG. 6. The puller 170 engages the handle portions 35 of the top mold section 30 and moves the assembled and unlatched mold 12 from the reassembly position 112 onto the mold elevator 85. The puller 170 of FIG. 6 includes a horizontally movable shaft 171 which pushes the mold 12 to a position on the mold elevator 85, and a pneumatically controlled rotatable hook member 172 which engages and disengages the handle portions 35 as desired, and under direction of the controller 22. The positions through which the hook member rotates for engagement and disengagement of the handle portions 35 are illustrated in FIG. 6. The mold elevator 85 is then vertically lowered using the actuator 94. The assembled mold 12 is then provided to the exiting station 88, which is opposite the receiving station 84 where the mold was initially provided to the separator-assembler device 20. The mold is transported via the conveyor 74 of the transport system 16 to a second mold latch mechanism 82. The mold latch mechanism 82 operates to engage the clamping device 46 of the molds at the conclusion of the reassembly process.

Using the conveyor 74 of the transfer system 16, the pre-treated, reassembled and clamped mold 12 is then either transported from the mold latching mechanism 82 of the separator-assembler device 20 to the injection apparatus 14 as shown in FIG. 1. Alternately, the molds may be provided to an apparatus for further pre-treatment of the mold 12 for the next injection process. In the alternate, partial embodiment of the invention illustrated in FIG. 7, the mold is transported to a pre-heat oven 23. In the event a polymer molding material requiring no such pre-treatment is used, this process would not be necessary. Upon completion of the pre-treatment steps to the mold, the mold is transported by the conveyor 74 to repeat the molding process.

A method and apparatus for continuously and nonsynchronously molding articles using a self-clamping, pre-loaded mold has been described. The method and apparatus are believed to reduce the overall time required to process each molded article, eliminate the formation of flash on the molded articles, and compensate for shrinkage of the molding material during the curing process. The molded articles produced using this method and apparatus have characteristics substantially equal to those manufactured pursuant to prior molding techniques. Additionally, the method and apparatus of the present invention require relatively small space, but may be readily expanded to increase the size of the system and thus the number of parts to be molded. The preferred form of the method and apparatus have been described above. However, with the present disclosure in mind it is believed that obvious alterations to the preferred embodiment, to achieve comparable features and advantages in other molding methods and apparatus, will become apparent to those of ordinary skill in the art.

We claim:

1. A method for continuously molding articles from a material curable by controlled temperature and pressure in a nonsynchronous system, said system including at least one independent, multi-section, self-clamping mold, a controller system coordinating injection of material into the mold and movement of the mold, at least one material injection press, a transfer system, at least one curing apparatus for curing the articles, and a mold separator-assembler, said method comprising the steps of:

a) pre-treating and assembling said multi-section mold in a clamped condition under a force sufficient to resist separation forces during injection of said molding material;

b) injecting material from said material injection press into said clamped mold upon receiving a signal from said controller system;

c) moving said clamped mold by said controller and transfer systems through said curing apparatus at a rate enabling said material to cure within said clamped mold;

d) moving said mold from said curing apparatus to said mold separator-assembler by said controller and transfer systems;

e) disassembling said clamped mold from said clamped condition in to mold sections;

f) removing said molded article from one mold section;

g) pre-treating, assembling and clamping said multi-section mold in clamped condition;

h) moving said pre-treated, assembled and clamped mold from said mold separator-assembler by said controller and transfer systems into position for injection molding of a molded article by said injection press; and i) disassembling said multi-section mold into sections in said mold separator-assembler, further comprises the step of positioning said sections adjacent one another in co-planar relationship.

2. A method for continuously molding articles from a material curable by controlled temperature and pressure in a nonsynchronous system, said system including at least one independent, multi-section, self-clamping mold, a controller system coordinating injection of material into the mold and movement of the mold, at least one material injection press, a transfer system, at least one curing apparatus for curing the articles, and a mold separator-assembler, said method comprising the steps of:

a) pre-treating and assembling said multi-section mold in a clamped condition under a force sufficient to resist separation forces during injection of said molding material;

b) injecting material from said material injection press into said clamped mold upon receiving a signal from said controller system;

c) moving said clamped mold by said controller and transfer systems through said curing apparatus at a rate enabling said material to cure within said clamped mold;

d) moving said mold from said curing apparatus to said mold separator-assembler by said controller and transfer systems;

e) disassembling said clamped mold from said clamped condition in to mold sections;

f) removing said molded article from one mold section;

g) pre-treating, assembling and clamping said multi-section mold in clamped condition;

h) moving said pre-treated, assembled and clamped mold from said mold separator-assembler by said controller and transfer systems into position for injection molding of a molded article by said injection press;

i) disassembling said multi-section mold into sections in said mold separator-assembler, further comprises the step of positioning said sections adjacent one another in co-planar relationship; and j) assembling said multi-section mold in clamped condition using said mold separator-assembler further comprises the step of moving said sections from adjacent co-planar relationship to parallel planar relationship in said mold separator-assembler.

3. Apparatus for continuously molding articles from a material curable under controlled temperature and pressure, said apparatus comprising at least one independent, multi-section, self-clamping mold under a force sufficient to resist separation forces during injection of said molding material in a clamped condition, at least one material injection press for injecting material into said mold, a transfer system for moving said mold through said apparatus, curing means for curing said articles and a mold separator-assembler, said mold separator-assembler having a disassembly station for unclamping and separating said multi-section mold into sections, at least one work station for locating said sections to permit the removal of molded articles, wherein said work station of said mold separator-assembler enables movement and location of said mold sections in co-planar relationship, and pre-treating said sections for the next injection of material into said mold, and a reassembly station for aligning said mold sections and clamping said multi-section mold in clamped condition.

4. The apparatus of claim 3 wherein said reassembly station of said mold separator-assembler enables movement and location of said mold sections in adjacent, parallel planar relationship.

5. The apparatus of claim 4 wherein said one work station is adapted for removing a molded article from at least one section of said multi-section mold, and a second work station is adapted for cleaning and inspecting said mold sections for injection molding.

6. The apparatus of claim 5 further comprising a controller system for controlling injection of material into said mold, and movement of said mold via said transfer system.

7. The apparatus of claim 6 wherein said multi-section, self-clamping mold is a single cavity mold.

* * * * *